Patented Aug. 27, 1940

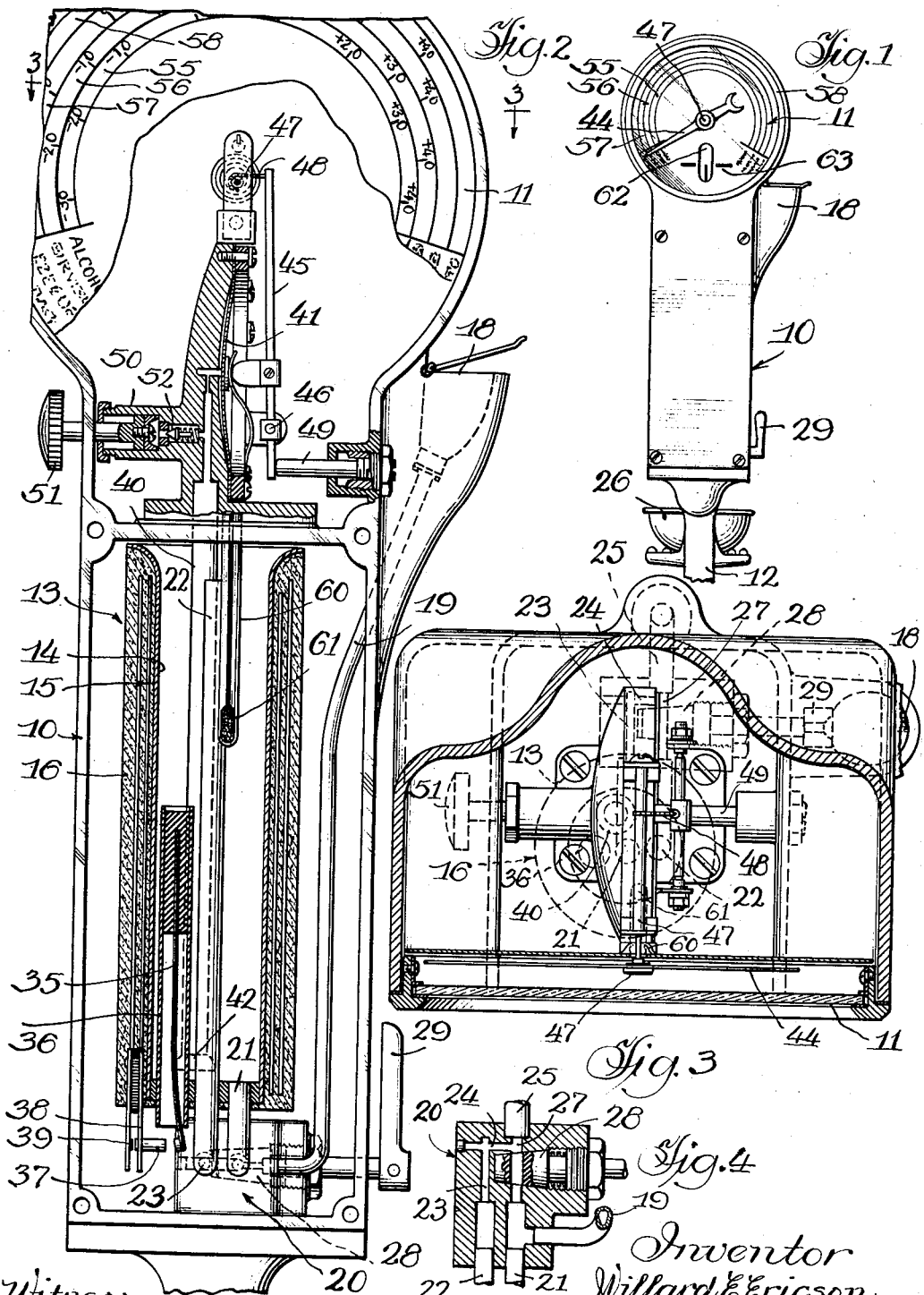

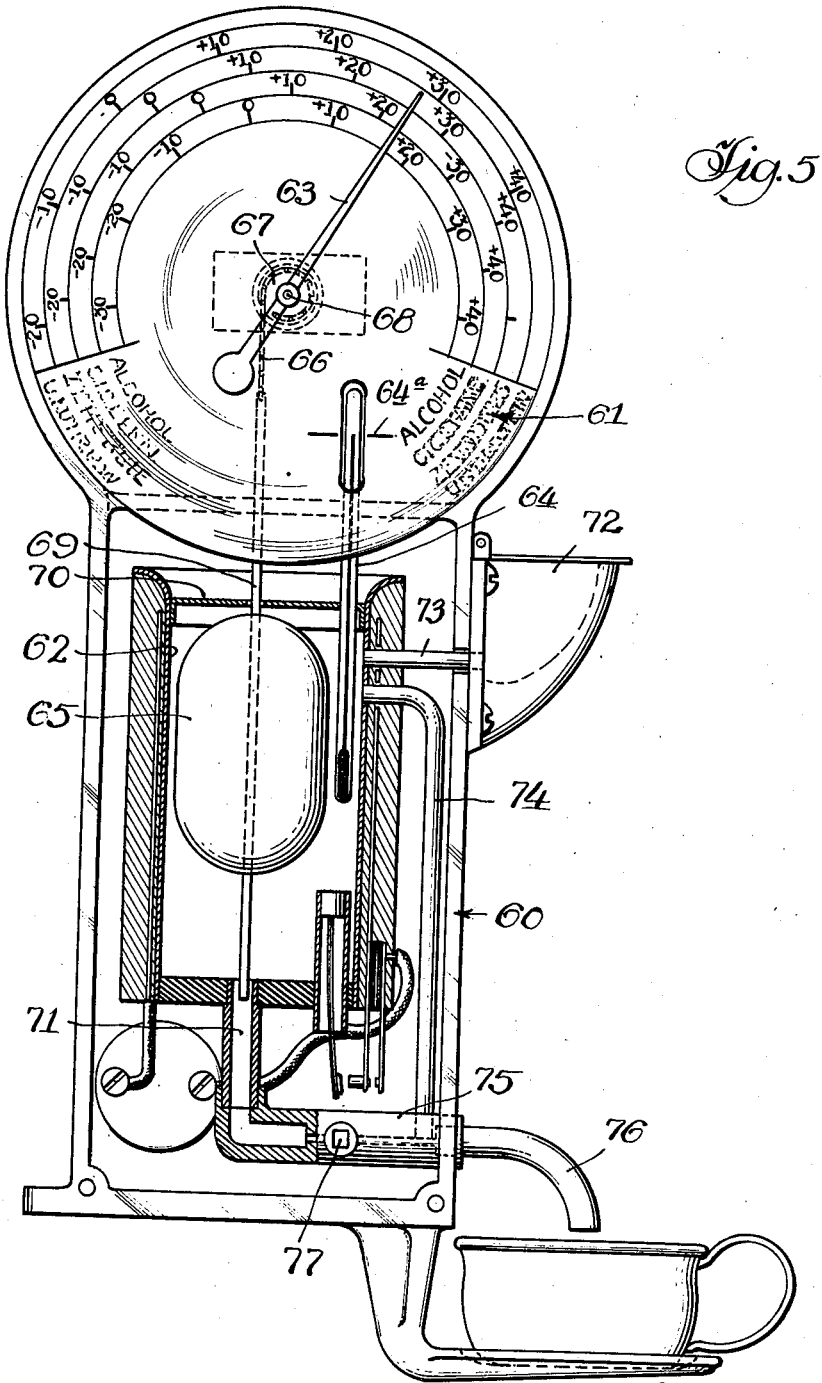

2,212,809

UNITED STATES PATENT OFFICE 2,212,809

ANTIFREEZE SOLUTION INDICATOR

Willard E. Ericson, Highland Park, Ill., assignor to E. Edelmann & Co., Chicago, Ill., a corporation of Illinois Application March 4, 1937, Serial No. 128,899
Renewed November 1, 1938

11 Claims. (Cl. 265—46)

This invention relates to improvements in antifreeze solution efficiency indicators, especially designed for testing automobile radiator solutions, although not necessarily limited to such use.

The principal object of my invention is to provide a simple and efficient instrument, preferably mounted in permanent position at a filling station or garage where it will be in plain view of automobile drivers when they drive in to test the freezing point of their antifreeze solution, said instrument being arranged to give the driver a direct and accurate visual reading applicable to the particular kind of antifreeze solution he is using in his car, and therefore eliminate the almost universal present practice of depending upon more or less uncertain observations made by a filling station attendant with the usual hand-operated hydrometer, with which accurate results require somewhat complicated computation quite unfamiliar to the average driver, based upon specific gravity and temperature of the solution.

In carrying out my invention, I provide a novel form of instrument including a relatively small test receptacle adapted to receive only a small sample, say, two or three ounces of the solution to be tested. The receptacle has thermostatically controlled electrical means for bringing the liquid contents thereof to a predetermined temperature, and also a gravity meter and a visual indicating dial associated therewith. Said dial is provided with a plurality of scales or bands, each calibrated in accordance with the freezing points of the principal commercial forms of antifreeze solutions in general use, such as alcohol, glycerine, etc. A thermometer is also mounted on the dial to indicate when the sample solution reaches the proper test point, at which the indicator on the dial will give a direct reading of the freezing point of the antifreeze solution being tested.

With this arrangement it will be understood that a small amount of solution is withdrawn from the automobile radiator by means of an ordinary rubber bulb, and is introduced into the receptacle where it is quickly brought to the proper test point as shown by the thermometer on the dial. The car driver may then note the freezing point of his antifreeze solution as indicated on the proper scale or band, for this kind of solution. When the observation is completed, the test solution may be drained off and returned to the radiator, if desired, but as will more often be the case, the sample used is such a small amount that it may be disregarded and thrown away by the filling station attendant.

The invention may best be understood by reference to the accompanying drawings, in which Fig. 1 is a front view of an instrument constructed in accordance with my invention.

Fig. 2 is an enlarged fragmentary view of the instrument with portions shown in vertical cross-section to illustrate the principal structural features thereof.

Fig. 3 is a section taken on line 3—3 of Fig. 2.

Fig. 4 is a detail view showing the arrangement of the inlet, drain and overflow passages of the device shown in Fig. 1.

Fig. 5 is a front view in part section of a modified form of instrument utilizing a gravity meter of the float type rather than a pressure gauge as employed in the form of device shown in the foregoing figures.

Referring now to details of the form of device shown in Figs. 1 to 3, both inclusive, I provide a casing indicated generally at 10 having a dial 11 thereon, and supported on a suitable pedestal 12. Within the lower part of the casing is mounted a sample testing receptacle indicated generally at 13, having a metallic inner lining 14 surrounded by a suitable electric heating element indicated at 15, enclosed as usual with any suitable insulation material indicated at 16. The receptacle is preferably of limited size so that it may be filled by a relatively small amount of liquid to be tested, say, in the neighborhood of two or three ounces. The sample solution to be tested is introduced into the receptacle through a filling orifice or funnel 18 formed at one side of the casing, and having an inlet pipe 19, herein shown as communicating with a fitting 20 disposed in the casing below the bottom of the receptacle 13. Said fitting also includes means for controlling the drainage from said receptacle, as will hereinafter more fully appear.

The height of the liquid within the receptacle is controlled by overflow pipe 22 standing upright within the receptacle, with its upper end open adjacent the top of the receptacle, and its lower end extending through the bottom of the receptacle and communicating with a drain passage 23 in fitting 20. As will be best seen in Fig. 4, the drain passage 23 communicates with a transverse passage 24 to a discharge pipe 25 leading to the exterior of the casing so that excess liquid introduced into the receptacle will drain into a suitable receptacle such as a bowl 26 removably mounted on the side of the pedestal 12 below the casing 10, as indicated in Fig. 1. The receptacle also has an outlet or drain pipe 21 at its bottom communicating with a passage 27 in the fitting

20, which leads to a discharge pipe 25, but which may be closed by means of a valve member 28 manually operable by handle 29 on the exterior of the casing.

Thermostatic means are also provided for regulating the temperature of the receptacle and maintaining it at a point where, upon introduction of a sample solution into the receptacle, the temperature of said sample will be quickly raised to a predetermined point at which the final reading is to be taken. As shown herein, the thermostatic control consists of a bimetallic element 35 of the usual construction enclosed in a tubular member 36 disposed adjacent one side wall of the receptacle and having its lower end extending through the bottom thereof so that the free end of the bimetallic member 35 may engage with a contact member 37 of a spring element 38, and urge the latter towards a co-operating contact 39 to control the current through the heating element 15 surrounding said receptacle.

The specific gravity of the solution within the receptacle shown in Figs. 1, 2 and 3 is determined from variations in the pressure of air within an air tube 40 projecting downwardly into the receptacle, with its lower bell-shaped opening 42 disposed at a predetermined distance below the top level of the overflow pipe 22. Variations in weight of the liquid between these two levels may be indicated by any suitable pressure-responsive device such as heretofore used commercially for indicating minute variations in air pressure, and including a diaphragm 41 having connection through a registering bar 45 fulcrumed on pin 46 and connected by chain 48 to the shaft 47 of an indicator or pointer 44 on dial 11. As usual, adjustment of the pointer may be provided by means of a screw 49 extending through one side of the casing and abutting one end of the registering bar as shown.

I also provide a small plunger pump indicated generally at 50 connected adjacent the upper end of the air tube 40 and manually operable from the exterior of the casing by a small knob 51 so that exterior air may be forced into the air tube from time to time when it is desired to expel accumulations of vapor or gases that may be become trapped within this tube after prolonged use. As will be seen from Fig. 2, the pump includes a check valve 52 arranged so that no air can escape from within the tube, but upon manipulation of the knob 51 exterior air can be introduced by pressure into the air tube 40.

It will be observed further that the dial 11 is provided with a series of calibrated bands indicated generally at 55, 56, 57 and 58, each of which bands is suitably marked to indicate the freezing points of different kinds of antifreeze solutions now in use, such as alcohol, glycerine, "Prestone" and "Zerone," as predetermined by variations in their respective specific gravities. These various bands are thus calibrated to give by direct reading of the dial the freezing point of the respective solutions, instead of indicating the specific gravity or the relative concentration of any given solution.

The dial also has mounted thereon visual means indicating the temperature of the solution, so as to show when the sample has reached its proper test point when the final observation of the dial reading should be taken. In the form shown, the temperature indicator consists of a mercury column thermometer 60 having its lower end 61 extending into the receptacle 13 and its upper end 62 extending into visible position on the dial 11 with a suitable line or mark 63 indicating the critical temperature or "test point" at which all final readings should be taken.

The use and operation of the device above described will now be understood. With the drain valve 29 in closed position, a small amount of sample solution is transferred from the radiator of the car into the filling orifice 18 by means of an ordinary rubber suction bulb. Escape of excess liquid from the discharge pipe 25 will show when the overflow level is reached. The temperature of the sample in the receptacle will be almost immediately raised to the proper test point, as indicated on the dial by the test point 63 associated with the upper end of the thermometer. When this test point is reached, the automobile driver may obtain a direct reading from the dial giving the exact freezing point of the particular type of solution he is using.

When the test is completed, the drain valve 29 is opened, whereupon all the liquid in the receptacle will be drained through the outlet pipe 21 and discharge pipe 25. At the same time any liquid within the inlet pipe 19 and fitting 20 will likewise be thoroughly drained from the device, so as to leave the instrument ready for the next test.

In the modified form of device shown in Fig. 5, the principal elements including the casing 60, dial 61, test receptacle 62, dial indicator 63, and thermometer 64 are provided in essentially the same arrangement as in the form previously described. Instead of operating the dial indicator 63 by means of an air column pressure gauge, however, I utilize a float 65 mounted in the receptacle 62 and operating upon the principle of an ordinary hydrometer. Said float is connected to the dial indicator 63 by means of a chain 66 having one end wrapped on a hub member 67 on the shaft 68 of said indicator and its lower end connected to a rod 69 which extends through the float and has its upper end guided in the cover 70 at the upper end of the receptacle and its lower end guided in the drain pipe 71 at the lower end of the receptacle. In this form of device, the sample liquid is introduced from the filling orifice 72 directly into the top of the receptacle by means of an inlet pipe 73, and the overflow pipe 74 which automatically limits the level of the solution within the receptacle extends through the side wall of the receptacle at the overflow level instead of being passed upwardly through the bottom wall thereof, as in the form shown in Fig. 1. Said overflow pipe is connected at its lower end with a fitting 75 having a discharge pipe 76 connected thereto. Said fitting also affords connection between the drain pipe 71 at the bottom of the receptacle and said discharge pipe through a valve member 77 which is manually operated as before to drain the receptacle after each test has been made. The dial 61 is also calibrated as before described to show the freezing points of several standard types of antifreeze solution, so that the instrument gives a direct reading of the freezing point of a given sample when the thermometer 64 indicates that the temperature of said sample has reached the proper test point indicated at 64a on the dial.

Although I have shown and described certain embodiments of my invention, it will be understood that I do not wish to be limited to the exact construction shown and described, but that various changes and modifications may be made without departing from the spirit and scope of my invention as defined in the appended claims.

I claim:

1. In a device for recording by a direct reading indicator the freezing points of a plurality of predetermined types of antifreeze solutions, which comprises a test receptacle of limited predetermined capacity adapted to receive a sample of test solution, means responsive to variations in specific gravity of such test solution in said receptacle and having a movable indicator visible from the exterior of the instrument, a plurality of scales associated with said visible indicator, said scales each being calibrated to show the freezing point of a specific form of antifreeze solution as determined by normal variations in the specific gravity of such solution at various degrees of relative concentration thereof but all of said determinations being based on the same predetermined temperature, and means responsive to the temperature of the solution in said receptacle including visible indicating means disposed adjacent said movable indicator, a heating element associated with said receptacle, and thermostatic control means for said heating element immersed in the liquid and adapted to regulate the temperature of said receptacle to a point where the temperature of a test solution therein will substantially equal said predetermined temperature.

2. In a specific gravity test meter of the character described, a sample-testing receptacle having an inlet pipe, an overflow pipe limiting the capacity of said receptacle and connected with a visible discharge pipe, an outlet pipe connected to said receptacle, having valve means for temporarily retaining a sample of liquid in said receptacle, specific gravity measuring means extending into said receptacle having visible indicating means associated therewith, temperature responsive means in said receptacle also having visible indicating means disposed adjacent said first named indicating means, and a heating element associated with said receptacle having thermostatic means in the liquid for automatically controlling and maintaining the temperature of said receptacle at a predetermined point.

3. In a specific gravity test meter of the character described, a sample testing receptacle having an inlet and an outlet, means limiting the liquid level of said receptacle, specific gravity measuring means including a hollow tube having an opening at a fixed level below said liquid level limiting means, air pressure responsive means directly connected to said tube and influenced by air confined therein having visible indicating means associated therewith, and manually controlled valve means for said outlet, temperature responsive means in said receptacle also having visible indicating means disposed adjacent said first named indicating means, and a heating element associated with said receptacle having thermostatic means for automatically controlling and maintaining the temperature of said receptacle at a predetermined point.

4. A specific gravity indicator comprising, a liquid receptacle, means calibrated at a predetermined temperature higher than usual atmospheric temperature to indicate the specific gravity of liquid in the receptacle, electric heating means to bring the liquid to the predetermined temperature, and a thermostat immersed in the liquid controlling the circuit to said electric heating means.

5. A specific gravity indicator comprising, a liquid receptacle, specific gravity indicating means associated with said receptacle and calibrated at a critical temperature higher than atmospheric temperature, controlled electrical heating means associated with the liquid receptacle for heating the liquid contents thereof to the predetermined critical temperature, a thermostat in the liquid receptacle controlling the heating means, and means separate from the indicating means to show attainment in the liquid of the critical temperature.

6. A specific gravity indicator comprising, a liquid receptacle, specific gravity indicating means associated with said receptacle and calibrated at a critical temperature higher than atmospheric temperature, electrical heating means associated with the liquid receptacle for heating the liquid contents thereof to the predetermined critical temperature, a thermostat control for the heating means in the liquid receptacle and consequently responsive to liquid temperatures, visible indicating means influenced by the temperature of liquid in the receptacle to show when said liquid reached the critical temperature, and a liquid discharge from said liquid receptacle whereby liquid is drained from proximity to the specific gravity indicating means and also the thermostat control means.

7. A specific gravity indicator comprising, a liquid receptacle, specific gravity indicating means to indicate the specific gravity of liquid in the receptacle calibrated at a predetermined temperature higher than atmospheric temperature, an electric heating coil encircling said liquid receptacle to heat said receptacle to the temperature of calibration, thermostat means in the liquid receptacle controlling the circuit to the heating coil to prevent overheating, and temperature indicating means affected by the temperature of liquid in the receptacle to indicate the critical temperature at which the specific gravity indicating means is calibrated.

8. In a specific gravity test meter, a liquid receptacle, specific gravity influenced means in said receptacle, visible indicating means operatively connected with said specific gravity influenced means, a visible scale member adjacent to said indicating means having a plurality of scales thereon calibrated at a critical temperature above atmospheric temperature and to show the freezing point of a plurality of different antifreeze solutions, controlled heating means associated with said receptacle to bring a test quantity of liquid therein to the predetermined critical temperature at which the scales adjacent to the indicating means are calibrated, and means immersed in the liquid controlling and rendering the heating means inoperative when the desired liquid temperature is attained.

9. In a specific gravity test meter, a liquid receptacle, specific gravity influenced means in said receptacle, visible indicating means operatively connected with said specific gravity influenced means, a visible scale member adjacent to said indicating means having a plurality of scales thereon calibrated at a critical temperature above atmospheric temperature and to show the freezing point of a plurality of different antifreeze solutions, controlled heating means associated with said receptacle to bring a test quantity of liquid therein to the predetermined critical temperature at which the scales adjacent to the indicating means are calibrated, and temperature responsive means in the liquid receptacle position to be immersed in a test quantity of liquid for cutting off the controlled heating means upon attainment of a predetermined desired temperature in the liquid.

10. A specific gravity indicator comprising a liquid receptacle, means calibrated at a predetermined temperature higher than usual atmospheric temperature to indicate the specific gravity of liquid in the receptacle, heating means to bring the liquid in the receptacle to the predetermined temperature, and temperature responsive means immersed in the liquid for controlling the heat when the desired predetermined temperature is attained.

11. A specific gravity indicator comprising a liquid receptacle, means calibrated at a predetermined temperature higher than usual atmospheric temperature to indicate the specific gravity of liquid in the receptacle, heating means to bring the liquid in the receptacle to the predetermined temperature, temperature responsive means immersed in the liquid for controlling the heat when the desired predetermined temperature is attained, and a liquid discharge from said liquid receptacle whereby liquid is drained from proximity to the specific gravity indicating means and also the temperature responsive heat control means.

WILLARD E. ERICSON.